(12) United States Patent
Pettitt et al.

(10) Patent No.: US 11,586,101 B2
(45) Date of Patent: Feb. 21, 2023

(54) LED ILLUMINATION WITH RED LASER ASSIST

(71) Applicant: TEXAS INSTRUMENTS INCORPORATED, Dallas, TX (US)

(72) Inventors: Gregory S. Pettitt, Sherman, TX (US); John M. Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 122 days.

(21) Appl. No.: 17/173,025

(22) Filed: Feb. 10, 2021

(65) Prior Publication Data
US 2021/0255534 A1 Aug. 19, 2021

Related U.S. Application Data

(60) Provisional application No. 62/976,467, filed on Feb. 14, 2020.

(51) Int. Cl.
| | |
|---|---|
| *G03B 21/00* | (2006.01) |
| *G03B 21/20* | (2006.01) |
| *G02B 5/26* | (2006.01) |
| *G02B 27/28* | (2006.01) |

(52) U.S. Cl.
CPC ........... *G03B 21/2033* (2013.01); *G02B 5/26* (2013.01); *G02B 27/283* (2013.01); *G03B 21/2013* (2013.01)

(58) Field of Classification Search
CPC .. G03B 21/2033; G03B 21/2013; G02B 5/26; G02B 27/283
See application file for complete search history.

(56) References Cited

U.S. PATENT DOCUMENTS

| | | | |
|---|---|---|---|
| 2007/0182932 A1* | 8/2007 | Bakker | G02B 27/149 353/20 |
| 2007/0273849 A1 | 11/2007 | Takeda | |
| 2010/0309439 A1 | 12/2010 | Bi et al. | |
| 2015/0177599 A1* | 6/2015 | Huang | G03B 21/2013 353/31 |
| 2015/0184810 A1 | 7/2015 | Nagase | |

(Continued)

FOREIGN PATENT DOCUMENTS

CN 207611232 U 7/2018

OTHER PUBLICATIONS

International Search Report and Written Opinion dated May 20, 2021, PCT Application No. PCT/US2021/017755, 8 pages.

*Primary Examiner* — Gerald J Sufleta, II
(74) *Attorney, Agent, or Firm* — Michelle F. Murray; Frank D. Cimino

(57) ABSTRACT

A system includes a red light emitting diode (LED), a blue LED, and a green LED. The system also includes a red laser, a first filter, a second filter, and a lens. The system includes a first optical path that includes the red LED, the red laser, the first filter, the second filter, and the lens, where the first filter has a filter response to transmit red light from the red laser and to reflect red light from the red LED. The system also includes a second optical path that includes the blue LED, the green LED, the second filter, and the lens, where the second filter has a filter response to transmit blue light from the blue LED, to transmit green light from the green LED, to reflect red light from the red laser, and to reflect red light from the red LED.

20 Claims, 7 Drawing Sheets

(56) References Cited

U.S. PATENT DOCUMENTS

| | | | |
|---|---|---|---|
| 2018/0164669 A1* | 6/2018 | Tian | H04N 9/3161 |
| 2019/0391473 A1* | 12/2019 | Uchiyama | G03B 21/2073 |
| 2020/0004120 A1* | 1/2020 | Chen | G03B 21/00 |
| 2021/0191138 A1* | 6/2021 | Zhai | G02B 26/008 |
| 2021/0191250 A1* | 6/2021 | Kurita | G03B 21/2033 |
| 2021/0389600 A1* | 12/2021 | Anazawa | G02B 27/1013 |

* cited by examiner

LED ILLUMINATION WITH RED LASER ASSIST

CROSS-REFERENCE TO RELATED APPLICATIONS

The present application claims priority to U.S. Provisional Patent Application No. 62/976,467, which was filed Feb. 14, 2020, is titled "LED Projector Illumination With Red Laser Assist," and is hereby incorporated herein by reference in its entirety.

BACKGROUND

Some optical projection systems use light emitting diodes (LEDs), such as blue, green, and red LEDs, as illumination sources. The output image quality of the projection system may be improved by achieving higher brightness from the illumination sources. One way to achieve higher brightness is to increase the output from the green LED. Some green LEDs have a phosphor on the output side of a blue LED. This type of green LED is called a converted green LED. An internal blue LED within the green LED shines on the phosphor, which causes the phosphor to emit green light. The green LED light output can be improved by shining blue light onto the top surface of the phosphor as well as the bottom surface. Utilizing this extra blue light to excite the phosphor from the top as well as the bottom sides is called a top side pump (TSP) green LED. With a TSP architecture, it is common to use an external blue LED to illuminate the front side of the converted green LED. This external illumination causes the green LED to emit more green light. The green light output may increase by up to 50%.

SUMMARY

In accordance with at least one example of the description, a system includes a red LED, a blue LED, and a green LED. The system also includes a red laser, a first filter, a second filter, and a lens. The system includes a first optical path that includes the red LED, the red laser, the first filter, the second filter, and the lens, where the first filter has a filter response to transmit red light from the red laser and to reflect red light from the red LED. The system also includes a second optical path that includes the blue LED, the green LED, the second filter, and the lens, where the second filter has a filter response to transmit blue light from the blue LED, to transmit green light from the green LED, to reflect red light from the red laser, and to reflect red light from the red LED.

In accordance with at least one example of the description, a system includes a red LED configured to emit red light at a first wavelength, a blue LED configured to emit blue light at a second wavelength, and a green LED configured to emit green light at a third wavelength. The system includes a laser configured to emit red light at a fourth wavelength, where the fourth wavelength is greater than the first wavelength. The system also includes a lens configured to receive the red light at the first wavelength, the blue light at the second wavelength, the green light at the third wavelength, and the red light at the fourth wavelength, and to transmit the received red, blue, and green light to an optical projector.

In accordance with at least one example of the description, a system includes a red LED configured to emit red light at a first wavelength, a blue LED configured to emit blue light at a second wavelength, and a green LED configured to emit green light at a third wavelength. The system includes a laser configured to emit red light at a fourth wavelength, where the fourth wavelength is greater than the first wavelength. The system also includes a filter configured to reflect the red light at approximately the first wavelength and transmit the red light at approximately the fourth wavelength. The system also includes a projection system configured to receive the red light at the first wavelength, the blue light at the second wavelength, the green light at the third wavelength, and the red light at the fourth wavelength, and to project an image via a projection lens.

BRIEF DESCRIPTION OF THE DRAWINGS

For a detailed description of various examples, reference will now be made to the accompanying drawings in which.

DETAILED DESCRIPTION

Figure 1:
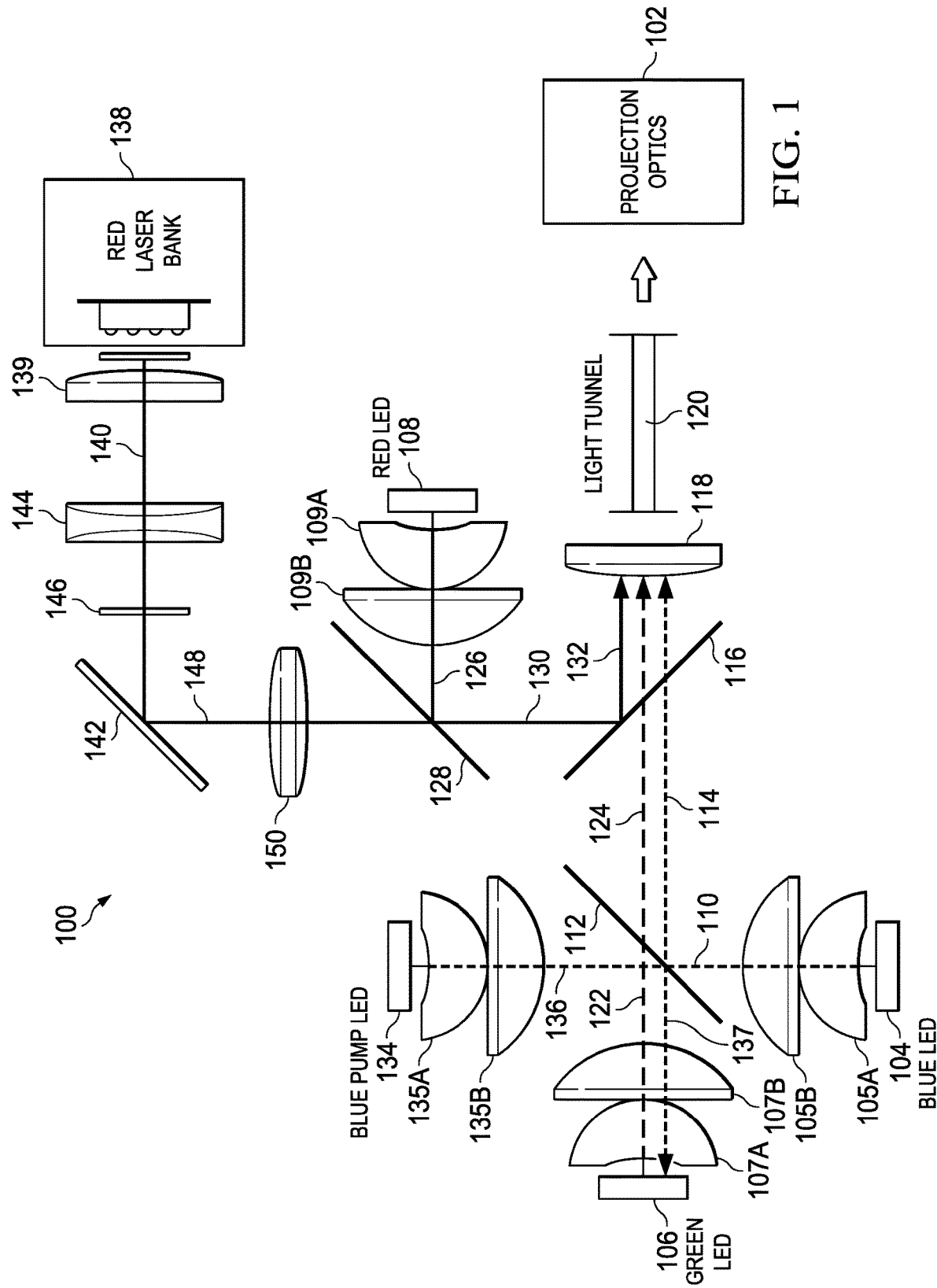
FIG. 1 is a system for light emitting diode (LED) illumination with red laser assist in accordance with various examples.

As described above, green light output may be increased to improve brightness in LED optical projection systems. However, increasing green light output presents other problems, such as when the projection system attempts to produce white light. Specifically, increasing the green light output without a corresponding increase in the red light output can cause the resulting white light to have a green tint. This happens because red LEDs generally cannot supply enough red light to balance the increase in the green output. Adding red LEDs often fails to adequately increase red light output because there is a limit to how much emitting area of the LED can be used by the projection system. This limit is given by the etendue of the projector system. The etendue is a measure of how much light emitted from a given light source can pass through the projector optical system. Once the etendue of the projector system is fully utilized by the LEDs, no additional light from the LEDs is able to be collected. In the case of a projector with a TSP green LED, there is often more green light available than red light needed for a proper white light color balanced projector output. In that case, the green LED must be turned down to a lower output than the green LED is capable of producing, which limits the projector output lumens. When the etendue of a projector system is filled, the only way to add more light is to add in other wavelengths of light not currently emitted by the LED sources.

In examples herein, a red laser that has a longer wavelength than the red LED is used to increase the total red output of the projector by combining the red light from the laser with the red light from the LED. The red laser can produce light at a longer wavelength than the red LED in some examples, which means the red laser can be combined with the red LED light and not be limited by the etendue that occur with the use of additional red LEDs or larger red LEDs. The red laser can be added to the optical system using dichroic filters. Because the red laser has a longer wavelength than the red LED, a filter is used to add to the red laser light emitted by the red LED and directed into the illumination components of the projection system. By adding more red light via the red laser, the green output can be increased with the TSP green LED, and the total lumens output of the projection system can be increased while maintaining a proper white balance. Increasing the red output with a red laser and increasing the green output with the TSP can create a white brightness increase of up to 40% in some example projection systems. Red lasers can also enable higher efficiency in the projection system. For example, if the lumens requirement of the projection system is lower, the addition of the red laser enables at least the red LED current to be reduced while still achieving the output lumens requirement, which increases the LED efficiency. The various examples described herein may be implemented in projection systems with a TSP or in projection systems without a TSP.

FIG. 1 is an LED illumination system 100 with red laser assist in accordance with various examples. LED illumination system 100 may be part of a light projection system in some examples, such as a spatial light modulator (SLM) optical projector in one example. LED illumination system 100 includes some of the components of an example light projection system, along with example optical paths (referred to herein as paths) taken by light sourced within and emitted from the LED illumination system 100. LED illumination system 100 includes projection optics 102 to receive the light sourced within LED illumination system 100 and project an image to a viewer. An SLM (not shown) could also receive the light sourced within LED illumination system 100 and then direct that light to projection optics 102. Projection optics 102 include any suitable optical components for projecting an image through an optical path, such as a projection lens, other lenses, apertures, prisms, etc. For example, light from LED illumination system 100 may pass through one or more prisms before being reflected by an SLM to an aperture. The aperture can adjust the light reflected from the SLM to an output lens of a projector.

LED illumination system 100 includes blue LED 104, green LED 106, and red LED 108. Blue LED 104, green LED 106, and red LED 108 each emit light at or near a specific wavelength corresponding to the color of the LED. Blue LED 104 emits light that travels through lenses 105A and 105B along path 110 to filter 112. Blue LED 104 emits light with a wavelength of approximately 440 to 475 nanometers (nm). Filter 112 is configured to reflect light at these wavelengths, so the light from blue LED 104 reflects off of filter 112 and travels along path 114. The light then passes through filter 116, which is configured to transmit light at the above wavelengths for blue light. The light then passes through lens 118 and light tunnel 120 to projection optics 102. Lens 118 can be a condenser lens in one example, and is used to focus the light into light tunnel 120. Light tunnel 120 receives the light through an inlet, repeatedly reflects the light on the reflective inner surfaces of the light tunnel so the luminance of the light becomes uniform, and then outputs the light at an outlet. In lieu of lens 118 and light tunnel 120, a Fly's Eye Array optic could be useful at the location of lens 118 to perform a similar function to light tunnel 120, which is to mix the light up so that an imager or spatial light modulator in the projection system can be illuminated with a uniform beam of light.

Green LED 106 emits light that travels through lenses 107A and 107B along path 122 to filter 112. Green LED 106 emits light with a broad wavelength of light, but light having a wavelength between approximately 500 and 600 nm is used by the projection system. Filter 112 is configured to transmit light above 500 nm, so the light having a wavelength between approximately 500 and 600 nm from green LED 106 passes through filter 112 and travels along path 124 to filter 116. The light then passes through filter 116, which is configured to transmit light at wavelengths below 600 nm. The light then passes through lens 118 and light tunnel 120 to projection optics 102.

Red LED 108 emits light that travels through lenses 109A and 109B along path 126 to filter 128. Red LED 108 emits light with a wavelength of approximately 600 to 640 nm. Filter 128 is configured to reflect light at approximately the wavelengths 635 nm and below, so the light from red LED 108 reflects off of filter 128 and travels along path 130. The light then reflects off of filter 116, which is configured to reflect light above the wavelength of approximately 600 nm. The light then travels along path 132, and passes through lens 118 and light tunnel 120 to projection optics 102.

LED illumination system 100 also includes blue pump LED 134. Blue pump LED 134 is configured to operate as a TSP. Blue pump LED 134 emits light that travels through lenses 135A and 135B along path 136 to filter 112. Blue pump LED 134 emits light with a wavelength of approximately 415 to 450 nm. Filter 112 is configured to reflect light at these wavelengths, so the light from blue pump LED 134 reflects off of filter 112 and travels along path 137 to green LED 106. Light from blue pump LED 134 illuminates the front side of green LED 106, which causes green LED 106 to emit more green light. As described above, increasing the green light and the red light can increase the brightness in an optical projection system.

In this example, LED illumination system 100 includes red laser bank 138. Red laser bank 138 emits red light used in LED illumination system 100 to balance the amount of green light from green LED 106. Red laser bank 138 may include one laser or any number of lasers. The laser or lasers of red laser bank 138 may be any suitable type of laser in various examples. Red laser bank 138 may use red laser diodes in one example. Red laser bank 138 may use lasers based on laser crystals, which are crystals that have laser-active dopants. Red laser bank 138 may use frequency doubled lasers or semiconductor lasers based on semiconductor gain media in other examples. Light from red laser bank 138 passes through lens 139. With blue pump LED 134, the amount of green light in LED illumination system 100 is increased. Likewise, red laser bank 138 increases the amount of red light in LED illumination system 100. In this example, light from red laser bank 138 has a longer wavelength than light from red LED 108. Light from red laser bank 138 with a longer wavelength than light from red LED 108 is used because the etendue of the projector system is filled, as described above. When the etendue is filled, the only way to add more red light is to add wavelengths of light that are not currently emitted by red LED 108. Therefore, light with a longer wavelength from red laser bank 138 is used, as those longer wavelengths are not emitted by red LED 108. Light from red laser bank 138 is approximately 640 nm in one example. The light from red laser bank 138 may be at another wavelength in other examples. The light may be above 635 nm in some examples. In other examples, the light from red laser bank 138 can be 638 nm, 642 nm, or in the range of 633 to 660 nm.

Light from red laser bank 138 is useful in examples herein because of its wavelength, bandwidth, and polarization. Different combinations of wavelength, bandwidth, and polarization are used in some examples. If polarized light from red laser bank 138 is used, shorter wavelengths can be used effectively in the example systems. If the source of the laser light is randomly polarized, then higher wavelengths are useful. In one example, the longer the wavelength of the laser light used, the less the additional lumens are added to the red light. In some examples, a narrow band quantum dot source is useful to produce the laser light, but this source may produce light that is randomly polarized. If the quantum dot source produces light that is randomly polarized, a slightly higher wavelength is useful compared to a polarized light source.

Light from red laser bank 138 travels along path 140 to mirror 142. Along path 140, light from red laser bank 138 can pass through lens 139, lens 144 and diffuser/despeckler 146. Lens 144 is used together with lens 139 to make the light beam smaller (e.g., compress the light beam) so that a smaller despeckler and/or diffuser element 146 is used. Lenses 139 and 144 keep the light beam compact so the diffusing/despeckler optics can be smaller and less expensive in one example.

Diffuser/despeckler 146 may include one or more optical elements that diffuses light from red laser bank 138, and can also include one or more optical elements that despeckles light from red laser bank 138. Diffusion and/or despeckling optical elements may be omitted in some examples.

Light from red laser bank 138 reflects off of mirror 142 and travels along path 148, through lens 150, and to filter 128. Lens 150 helps couple the light from red laser bank 138 to light tunnel 120 efficiently. Even though lens 150 is shown in the red laser path 148, it could also be placed between filters 112 and 116 to improve efficiency of those LED to light tunnel 120 paths. Filter 128 is configured to reflect light at the wavelengths of light from red LED 108, as described above (approximately 600 to 630 nm). Filter 128 is a dichroic filter that is also configured to transmit light at the wavelengths of the light from red laser bank 138, such as 640 nm. Light from red laser bank 138 passes through filter 128 to filter 116, where it is reflected and travels along path 132. The light from red laser bank 138 passes through lens 118 and light tunnel 120 to projection optics 102.

In LED illumination system 100, projections optics 102 receive increased green light due to blue pump LED 134, and receive increased red light due to red laser bank 138. These increases enable projection optics 102 to project brighter images and create a proper white light color balanced projector output. As described below, the use of red laser bank 138 also enables increased power efficiency in LED illumination system 100.

In other examples, the structure of the components in LED illumination system 100 may be rearranged but the system would still fall within the scope of the examples described herein. For example, the locations of red LED 108 and red laser bank 138 could be switched, along with the locations of the various lenses, mirrors, and other components associated with those two light sources. Then, filter 128 could be configured to reflect the light from red laser bank 138 and transmit the light from red LED 108. Other LEDs or filters in LED illumination system 100 could be rearranged as well. Also, additional lenses, mirrors, filters, or prisms are useful in other examples.

LED illumination system 100 includes multiple optical paths for light to travel. A first optical path includes red LED 108, red laser bank 138, filter 128, filter 116, and lens 118. The first optical path includes light from red laser bank 138 that is transmitted by filter 128 and light from red LED 108 that is reflected by filter 128. Light in the first optical path is reflected by filter 116 to lens 118.

LED illumination system 100 includes a second optical path that includes blue LED 104, green LED 106, filter 112, filter 116, and lens 118. Filter 116 has a filter response that transmits blue light from blue LED 104, transmits green light from green LED 106, reflects red light from red laser bank 138, and reflects red light from red LED 108.

LED illumination system 100 includes a third optical path that includes blue pump LED 134, filter 112, and green LED 106. In this third optical path, light from blue pump LED 134 is reflected by filter 112 to green LED 106.

Figure 2:
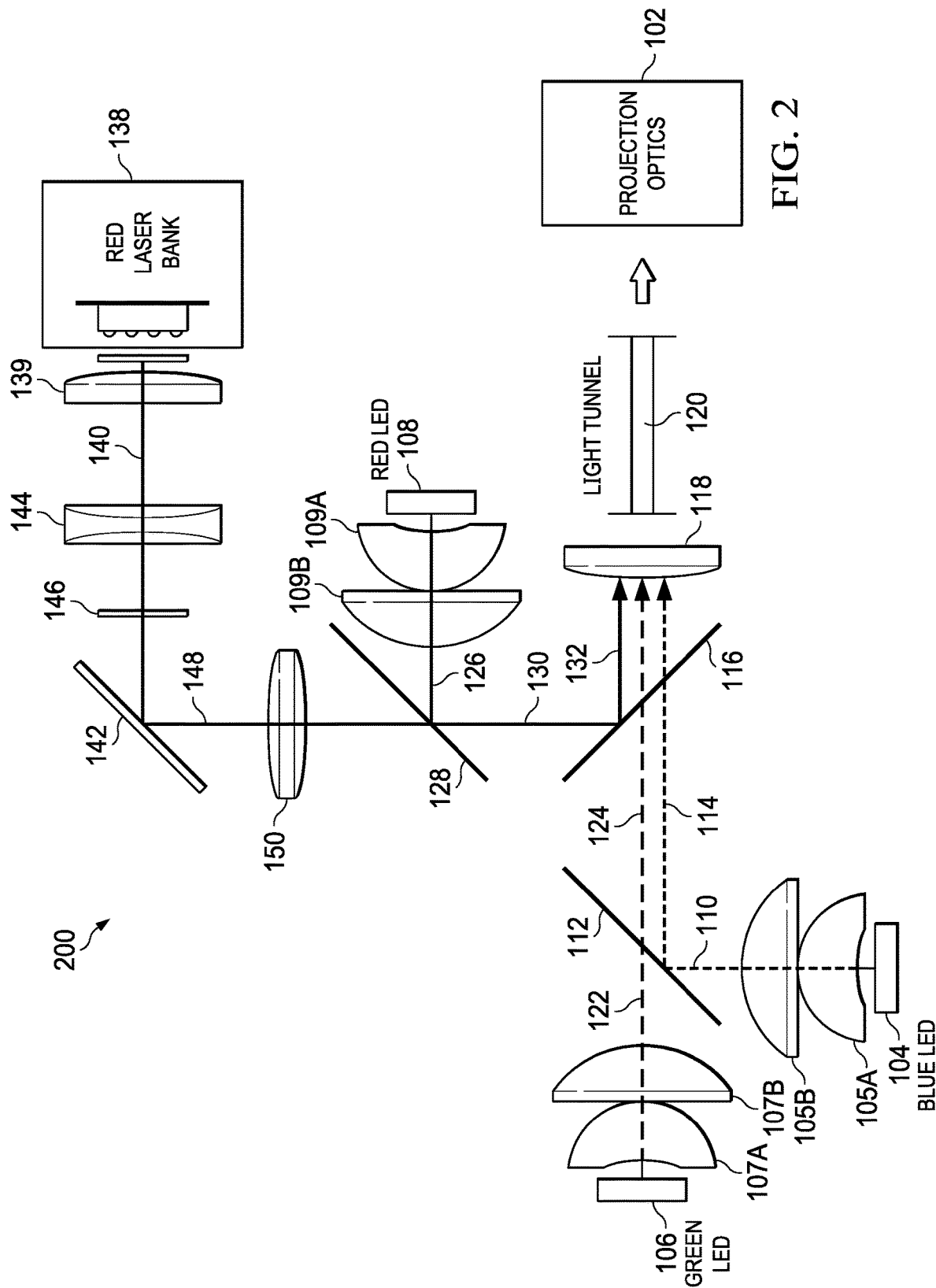
FIG. 2 is a system for LED illumination with red laser assist in accordance with various examples.

FIG. 2 is an LED illumination system 200 with red laser assist in accordance with various examples. LED illumination system 200 is similar in structure and operation to LED illumination system 100, and like reference numerals denote like components. The components of LED illumination system 200 are not described in detail; those descriptions can be found with respect to FIG. 1 above. LED illumination system 200 differs from LED illumination system 100 in that LED illumination system 200 does not include blue pump LED 134. In LED illumination system 200, green light is not increased with the use of blue pump LED 134. However, red light is increased with the use of red laser bank 138. In some examples, LED illumination system 200 is used to provide increased red light with less power consumption than LED illumination system 100. The power savings are due to the absence of blue pump LED 134. The LED illumination system 200 may also achieve efficiencies by reducing the amount of current flowing through the red LED 108 and instead supplying additional red light via the red laser bank 138, as described above.

Figure 3:
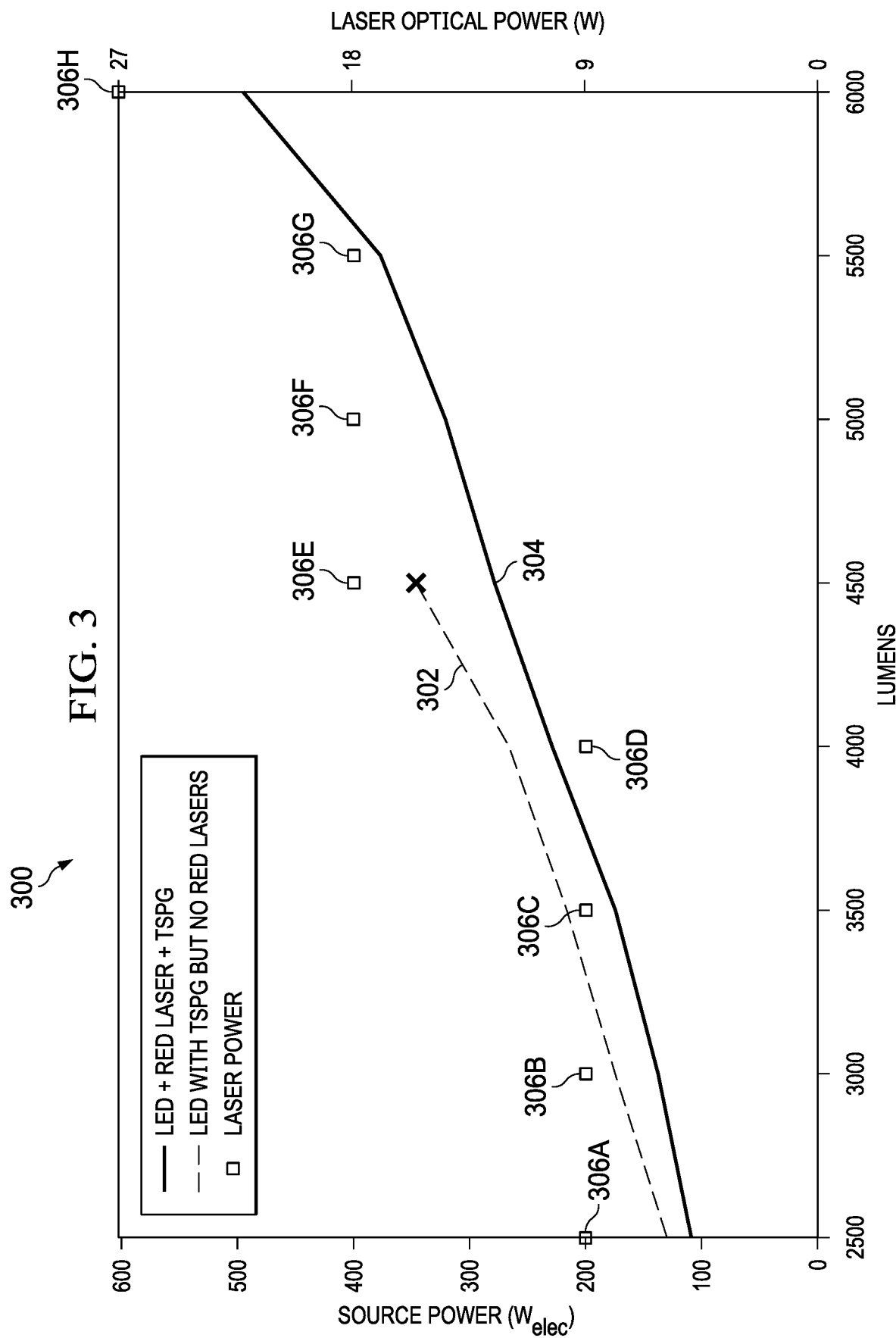
FIG. 3 is a graph of source power versus projector lumens with and without red laser assist in accordance with various examples.

FIG. 3 is a graph 300 of source power versus projector lumens output with and without red laser assist in accordance with various examples. The x-axis of graph 300 indicates luminous flux in lumens (for the projector). The y-axis on the left side of graph 300 indicates the source power of the illumination system in watts (W). The y-axis on the right side of graph 300 indicates the red laser optical power in W.

In graph 300, curve 302 represents the source power for an LED illumination system with a top side pump green (TSPG) LED but without a red laser. Curve 304 represents the source power for a similar LED illumination system with a TSPG LED and a red laser. As seen in graph 300, as source power increases, the lumens output increases as well for both systems. However, the LED system with a red laser (represented by curve 304) uses less source power than the LED system without a red laser (represented by curve 302) for a given value of projector lumens on the x-axis. Therefore, the illumination system with the red laser is more efficient.

Graph 300 also indicates the laser optical power of the red laser. Points 306A, 306B, 306C, 306D, 306E, 306F, 306G, and 306H indicate the level of laser optical power for a given value of lumens. For example, points 306A, 306B, 306C, and 306D indicate that the laser optical power used to produce curve 304 was 9 W at those lumen levels. Points 306E, 306F, and 306G indicate that the laser optical power used to produce curve 304 was 18 W at those lumen levels. Point 306H indicates that the laser optical power used to produce curve 304 was 27 W at that lumen level. These optical power levels were selected for this example; other optical power levels are useful in other examples.

Graph 300 also indicates that the lumens output can be extended to a higher amount with the addition of a red laser. Curve 302 reaches a maximum lumens output at around 4500 lumens. Curve 304 indicates that the lumens output can reach to at least 6000 lumens with the appropriate laser optical power. Curve 304 shows that the TSPG LED lumen output can be fully utilized by the projection system when red laser light is added to the red LED light output.

Figure 4:
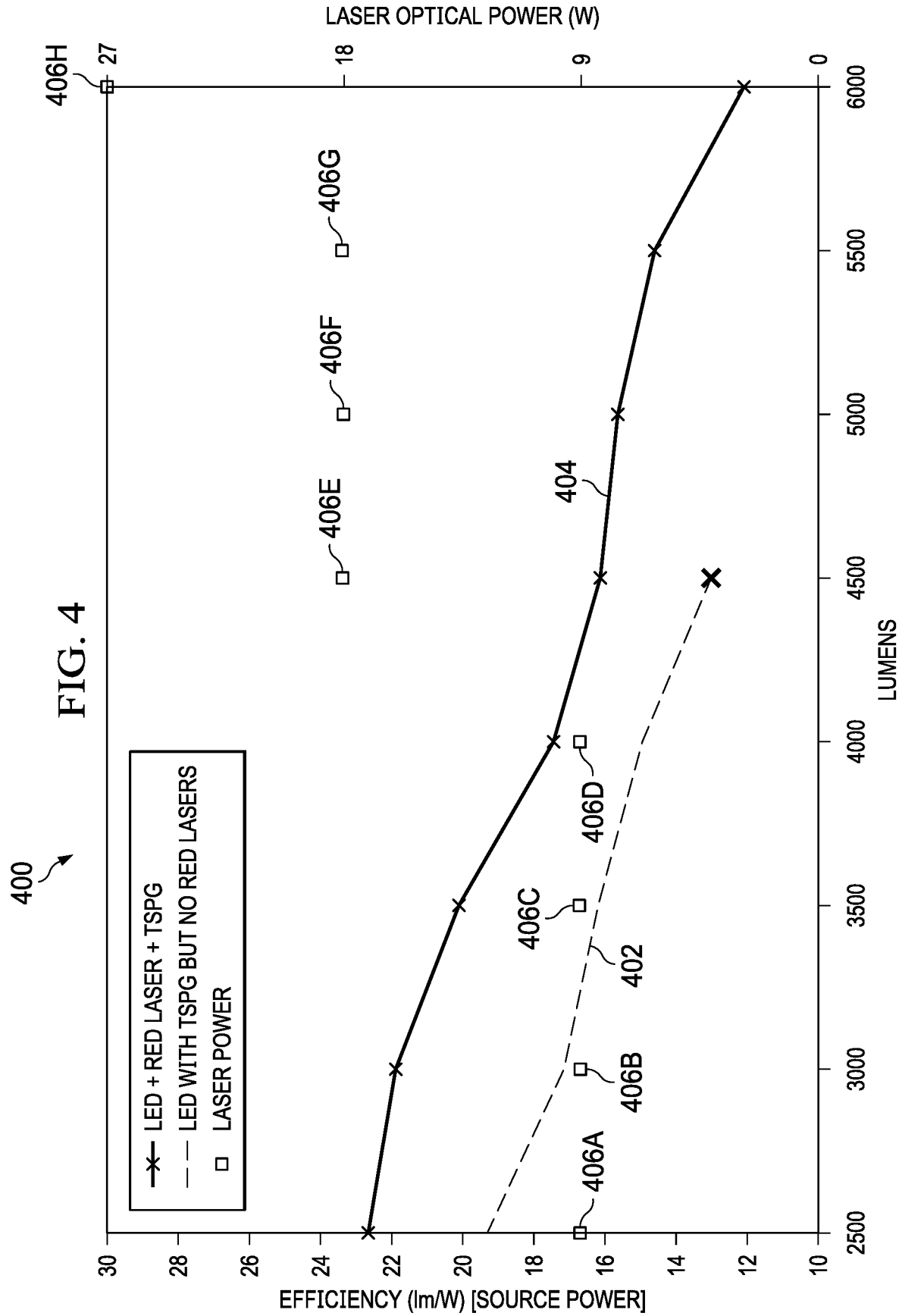
FIG. 4 is a graph of projector efficiency with and without red laser assist in accordance with various examples.

FIG. 4 is a graph 400 of projector system efficiency with and without red laser assist in accordance with various examples. The test systems and conditions used to create graph 300 are similar to the test systems and conditions used to create graph 400. As evident from graph 300 above, a projection system with a TSPG LED and the addition of the red laser uses less power than the projection system with a TSPG LED but without the red laser. Therefore, the system with the red laser will also be more efficient. The efficiency is shown in graph 400. The x-axis of graph 400 indicates the luminous flux in lumens (for the projector). The y-axis on the left side of graph 400 indicates efficiency, which is measured in lumens per Watt (lm/W). The y-axis on the right side of graph 400 indicates the laser optical power in W.

In graph 400, curve 402 represents the efficiency for an LED illumination system with a TSPG LED but without a red laser. Curve 404 represents the source power for a similar LED illumination system with a TSPG LED and a red laser. As seen in graph 400, as the output lumens increases, the efficiency decreases for each system. However, at a given lumen output level on the x-axis, the LED system with red laser (represented by curve 404) is more efficient than the LED system without a red laser (represented by curve 402) for a given value of projector lumens on the x-axis. Therefore, the illumination system with the red laser is more efficient.

Graph 400 also indicates the laser optical power of the red laser. Points 406A, 406B, 406C, 406D, 406E, 406F, 406G, and 406H indicate the level of laser optical power for a given value of lumens. For example, points 406A, 406B, 406C, and 406D indicate that the laser optical power used to produce curve 404 was 9 W at those lumen levels. Points 406E, 406F, and 406G indicate that the laser optical power used to produce curve 404 was 18 W at those lumen levels. Point 406H indicates that the laser optical power used to produce curve 404 was 27 W at that lumen level. These optical power levels were selected for this example; other optical power levels are useful in other examples.

Figure 5:
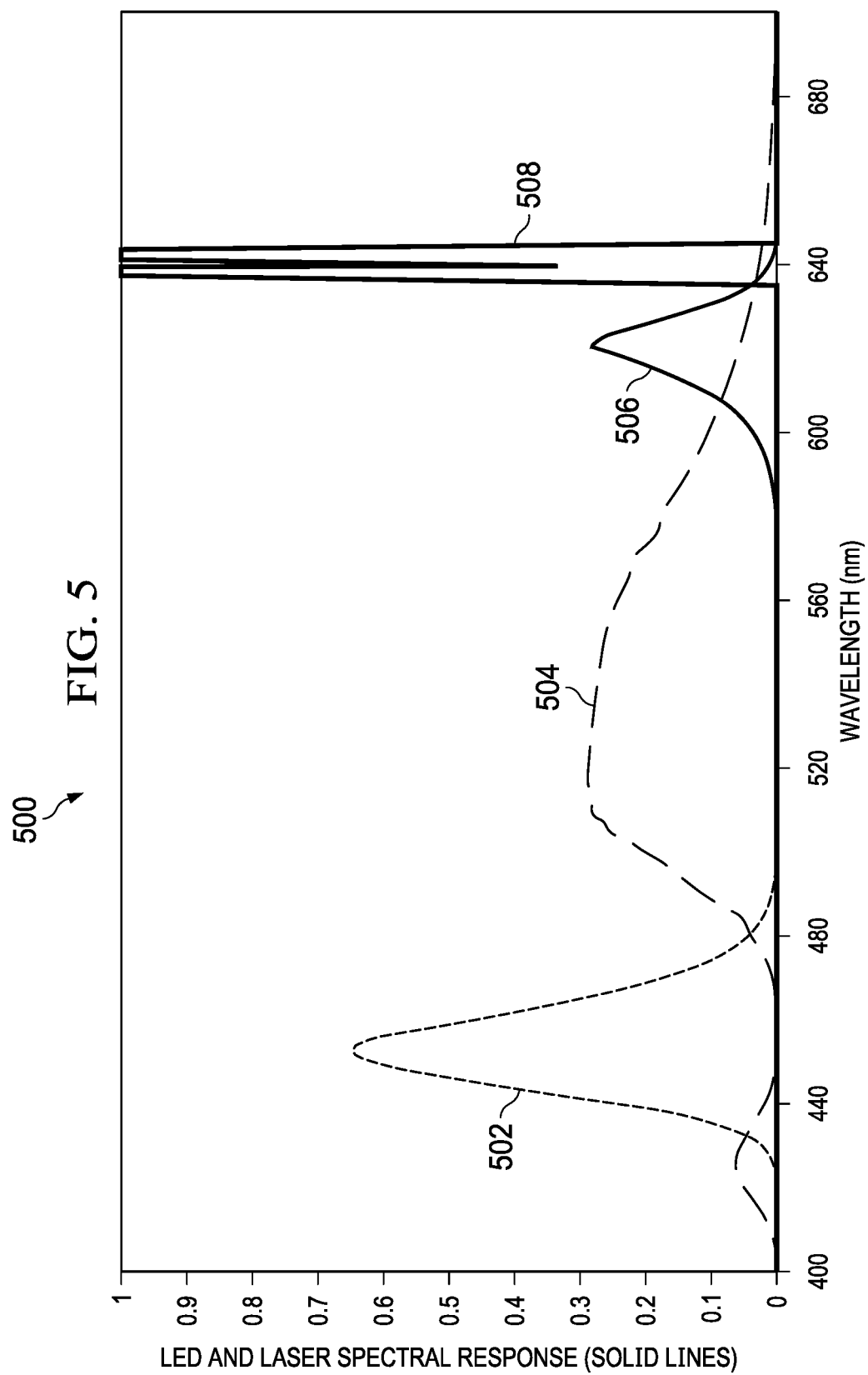
FIG. 5 is a graph of spectral response in accordance with various examples.

FIG. 5 is a graph 500 of spectral response in accordance with various examples. The x-axis of graph 500 indicates wavelength in nm. The y-axis of graph 500 indicates the LED and Laser Spectral Response, on a normalized scale of 0.0 to 1.0. These responses are indicated with the curves on graph 500.

Curve 502 is the spectral response of blue light from blue LED 104 in an example. Blue light has a wavelength of approximately 440 to 475 nm in this example, with a peak shown on curve 502 near 455 nm. Curve 504 is the spectral response of green light from green LED 106 in an example. Green light has a wavelength of approximately 500 to 600 nm in this example, with a peak shown on curve 504 near 520 nm. Curve 506 is the spectral response of red light from red LED 108 in an example. Red LED light has a wavelength of approximately 600 to 630 nm in this example, with a peak shown on curve 506 near 620 nm. Curve 508 is the spectral response of red light from red laser bank 138 in an example. This red laser light has a wavelength of approximately 640 nm.

As described above, red laser light from red laser bank 138 has a longer wavelength than light from red LED 108. Because the wavelengths are different, a dichroic filter can be used that transmits the light from red laser bank 138 but reflects the light from red LED 108. One example of this type of filter is filter 128 in FIGS. 1 and 2. The reflection response of this example filter is shown in FIG. 6.

In some examples, the light from red laser bank 138 can be polarized. If light is linearly polarized, the electric field of the laser beam oscillates in a certain linear direction perpendicular to the beam axis, and the magnetic field oscillates in a direction that is perpendicular both to the propagation axis and the electric field direction. The polarization state of light often matters if light strikes an optical surface under some angle (such as filter 128). A linear polarization state is denoted as p polarization if the electric field direction lies in the plane spanned by the incoming beam and the reflected beam. The polarization state of the light with a direction perpendicular to that plane is called s polarization.

Figure 6:
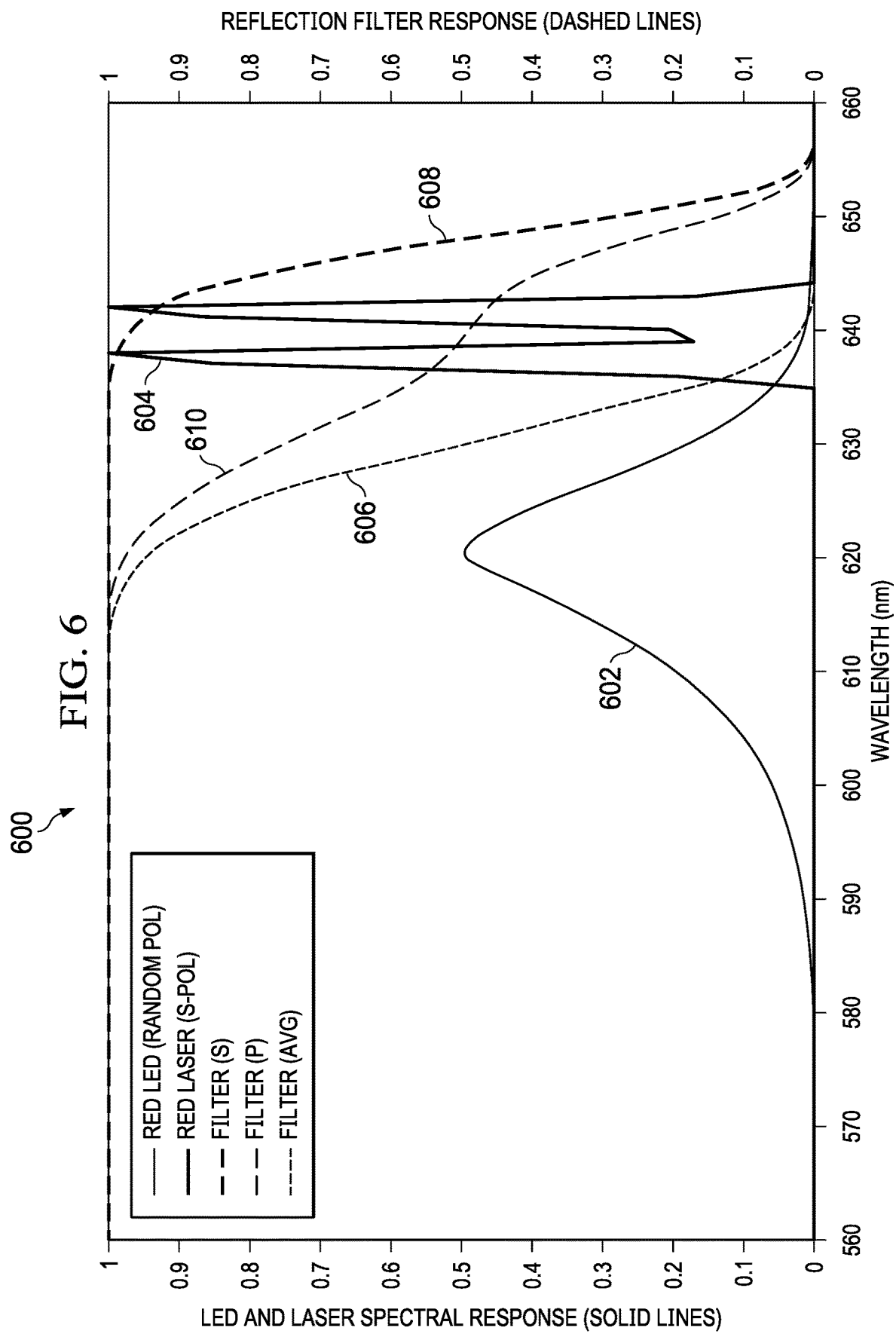
FIG. 6 is a graph of spectral response and reflectivity filter response in accordance with various examples.

FIG. 6 is a graph 600 of spectral response and reflectivity filter response in accordance with various examples. The x-axis of graph 600 indicates wavelength in nm. The y-axis on the left side of graph 600 indicates the LED and Laser Spectral Response, on a normalized scale of 0.0 to 1.0. These responses are indicated with the solid curves on graph 600. The y-axis on the right side of graph 600 indicates the Reflection Filter Response, on a normalized scale of 0.0 to 1.0 These responses are indicated with the dashed curves on graph 600.

Curve 602 is the spectral response of red light from red LED 108 in an example. Red light has a wavelength of approximately 600 to 630 nm in this example, with a peak shown on curve 602 near 620 nm. Curve 604 is the spectral response of red light from red laser bank 138 in an example. This red laser light has a wavelength centered at approximately 640 nm.

Curve 606 represents the reflection filter response for a filter such as filter 128 for s polarized light. If s polarized light strikes filter 128, filter 128 has a reflection response corresponding to curve 606. Before approximately 620 nm, curve 606 has a reflection response of approximately 1.0. Filter 128 completely reflects wavelengths below 620 nm for s polarized light. At 620 nm, curve 606 begins to drop, and reaches a reflection response of 0.0 at approximately 640 nm. Filter 128 therefore completely transmits s polarized light at wavelengths above approximately 640 nm, with some light being transmitted and some light being reflected between 620 and 640 nm. If the light from red laser bank 138 is s polarized and centered near 640 nm, the light from red laser bank 138 will mostly be transmitted by filter 128 in this example.

If the light from red laser bank 138 is p polarized, filter 128 has a different reflectivity response than for s polarized light. Curve 608 represents the reflectivity response of filter 128 for p polarized light. Before approximately 640 nm, curve 608 has a reflection response of approximately 1.0. At 640 nm, curve 608 begins to drop, and reaches a reflection response of 0.0 at approximately 655 nm. Filter 128 therefore completely transmits p polarized light at wavelengths above approximately 655 nm. If the light from red laser bank 138 is p polarized and centered near 640 nm, the light from red laser bank 138 would be mostly reflected by filter 128.

Curve 610 represents the response of filter 128 if the light from red laser bank 138 is a mixture of roughly equal parts s and p polarized light (or, if the light is randomly polarized). Curve 610 has a reflection response of approximately 1.0 at 620 nm and a reflection response of 0.0 at approximately 655 nm. If the light from red laser bank 138 was a mixture of equal parts s and p polarized light centered at 640 nm, some of the light would be reflected and some of the light would be transmitted according to the filter response indicated by curve 610. In one example, light from red LED 108 is randomly polarized, and this light has equal amounts of s-pol and p-pol light. As such, light from red LED 108 responds like curve 610, which passes more of the LED spectrum. In the example where light from red laser bank 138 is s-polarized, this light responds the filter represented by curve 606 which passes most or all of the laser light. Therefore, red LED 108 and red laser bank 138 are able to transmit more light compared to the case where both red LED 108 and red laser bank produce light that is randomly polarized. If the lasers were randomly polarized, light from the lasers would respond to the filter shown as curve 610, and approximately half of the laser light would be lost via the filter.

In other examples, light from red laser bank 138 may have a different wavelength. In those examples, filter 128 or other filters could be configured to either transmit or reflect the light from red laser bank 138 at the different wavelength according to the layout of the illumination system. In some examples, p polarized light is reflected while s polarized light is transmitted. In other examples, s polarized light is reflected while p polarized light is transmitted. Any suitable type of filter with any suitable reflection response may be used.

Figure 7:
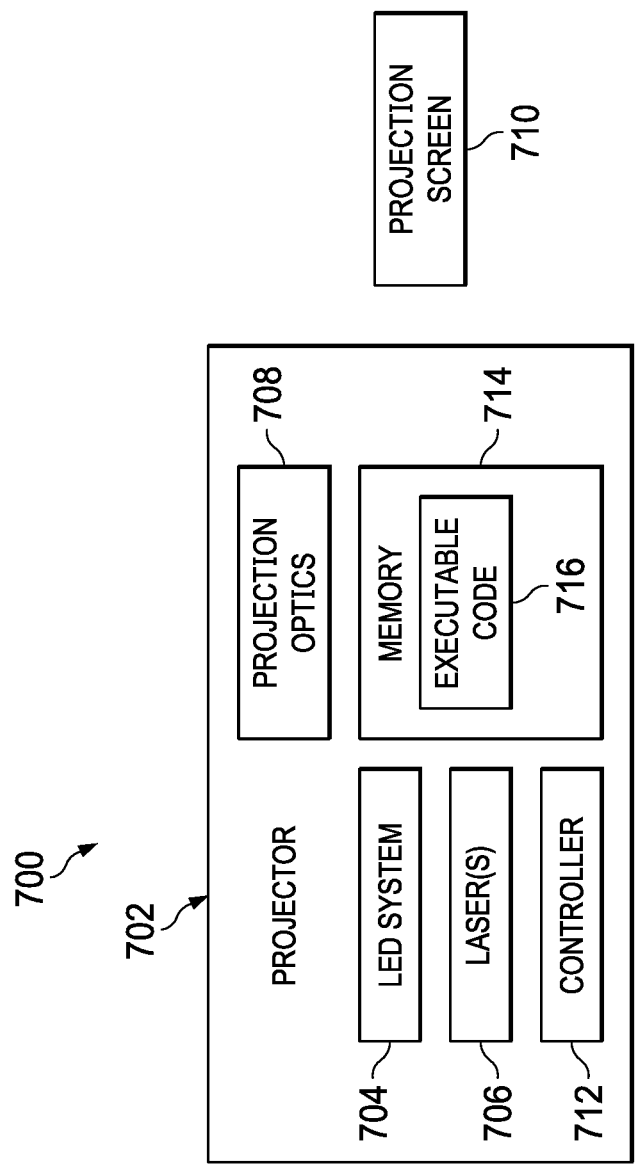
FIG. 7 is an optical projection system in accordance with various examples.

FIG. 7 is an optical projection system 700 in accordance with various examples. Optical projection system 700 includes a projector 702. Projector 702 can include some or all of the components described above with respect to FIGS. 1 and 2. Projector 702 includes LED system 704. In an example, LED system 704 includes LEDs 104, 106, and 108 as described above. LED system 704 can also include blue pump LED 134 in examples that use a TSPG LED. LED system 704 can include the lenses, filters, and mirrors as described above, or any other suitable optical components in other examples.

Projector 702 also includes lasers 706. Lasers 706 can include red laser bank 138 in an example. Red laser bank 138 is operable to increase the amount of red light in optical projection system 700 for the reasons described above. Projector 702 also includes projection optics 708. Projection optics 708 include any suitable optical components for projecting an image through an optical path, such as a projection lens, other lenses, apertures, prisms, spatial light modulators, etc.

Optical projection system 700 includes projection screen 710. Images from projector 702 are projected onto projection screen 710 for viewing. Any suitable type of projection screen 710 may be used in optical projection system 700.

Projector 702 includes a controller 712 and memory 714 in this example. The memory 714 includes executable code 716. The executable code 716, when executed by controller 712 or another processor, causes the controller 712 to perform one or more of the actions described herein and attributed to the projector 702, or LED illumination systems 100 and 200. These actions can include using the components of projector 702 to project an image onto projection screen 710.

As described above, the addition of a red laser to the illumination systems herein can increase the brightness of a projection system. The brightness can be increased for systems with a TSP architecture and systems without a TSP architecture. The addition of a red laser can also increase power efficiency of the illumination system, as shown in FIGS. 3 and 4. A dichroic filter is useful in some examples so the red laser can be placed in the optical path of the illumination system. Polarization of light is also useful to improve filter efficiency as described above.

In this description, the term "couple" may cover connections, communications, or signal paths that enable a functional relationship consistent with this description. For example, if device A provides a signal to control device B to perform an action, then: (a) in a first example, device A is directly coupled to device B; or (b) in a second example device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
   a red light emitting diode (LED), a blue LED, and a green LED;
   a red laser;
   a first filter, a second filter, and a lens;
      a first optical path that includes the red LED, the red laser, the first filter, the second filter, and the lens, wherein the first filter has a filter response to transmit polarized red light from the red laser having a first wavelength and to reflect red light from the red LED having a second wavelength; and
      a second optical path that includes the blue LED, the green LED, the second filter, and the lens, wherein the second filter has a filter response to transmit blue light from the blue LED, to transmit green light from the green LED, to reflect the polarized red light from the red laser, and to reflect the red light from the red LED.

2. The system of claim 1, wherein the blue LED is a first blue LED, and the system further comprises:
   a second blue LED and a third filter, wherein the third filter has a response that reflects blue light from the first blue LED and the second blue LED; and
   a third optical path that includes the second blue LED, the third filter, and the green LED.

3. The system of claim 1, wherein the first filter is configured to transmit s polarized light from the red laser and to reflect p polarized light from the red laser.

4. The system of claim 1, wherein the first filter is configured to transmit light at approximately 640 nanometers and to reflect light below approximately 620 nanometers.

5. A system, comprising:
   a red light emitting diode (LED) configured to emit red light at a first wavelength;

a blue LED configured to emit blue light at a second wavelength;

a green LED configured to emit green light at a third wavelength;

a laser configured to emit polarized red light at a fourth wavelength, wherein the fourth wavelength is greater than the first wavelength;

a first filter optically coupled to the red LED and to the laser, the first filter configured to reflect the red light at the first wavelength and to transmit the polarized red light at the fourth wavelength; and a second filter optically coupled to the first filter, to the blue LED, and to the green LED, the second filter configured to reflect the red light at the first wavelength, transmit the blue light at the second wavelength, transmit the green light at the third wavelength, and reflect the polarized red light at the fourth wavelength towards a lens.

6. The system of claim 5, wherein the red light at the fourth wavelength is s polarized light, and the first filter is further configured to transmit s polarized light at the fourth wavelength.

7. The system of claim 6, wherein the first filter is further configured to transmit randomly polarized light at a wavelength higher than the fourth wavelength.

8. The system of claim 5, wherein the blue LED is a first blue LED, and the system further comprises:
a second blue LED configured to emit blue light at the second wavelength; and
a third filter optically coupled to the first blue LED and to the second blue LED, the second filter configured to reflect the blue light at the second wavelength from the second blue LED towards the green LED and to reflect the blue light at the second wavelength from the first blue LED towards the second filter.

9. The system of claim 8, wherein the green LED is configured to increase the green light at the third wavelength emitted from the green LED responsive to receiving the blue light at the second wavelength from the second blue LED.

10. The system of claim 5, wherein the fourth wavelength is approximately 640 nanometers.

11. The system of claim 5, further comprising a diffuser configured to diffuse the red light at the fourth wavelength emitted by the laser.

12. The system of claim 5, further comprising an optical element configured to reduce a speckle on a projection screen caused by the red light at the fourth wavelength emitted by the laser.

13. A system, comprising:
a red light emitting diode (LED) configured to emit red light at a first wavelength;
a blue LED configured to emit blue light at a second wavelength;
a green LED configured to emit green light at a third wavelength;
a laser configured to emit polarized red light at a fourth wavelength, wherein the fourth wavelength is greater than the first wavelength;
a filter optically coupled to the red LED and to the laser, the filter configured to reflect the red light at the first wavelength and transmit the polarized red light at the fourth wavelength; and
a projection elements optically coupled to the filter, to the blue LED, and to the green LED, the projection elements configured to receive the red light at the first wavelength, the blue light at the second wavelength, the green light at the third wavelength, and the polarized red light at the fourth wavelength, and to project an image based on the red light at the first wavelength, the blue light at the second wavelength, the green light at the third wavelength, and the polarized red light at the fourth wavelength.

14. The system of claim 13, wherein the blue LED is a first blue LED, the filter is a first filter, and the system further comprises:
a second blue LED configured to emit blue light at the second wavelength; and
a second filter configured to reflect the blue light at the second wavelength from the second blue LED towards the green LED.

15. The system of claim 14, wherein the green LED is configured to increase the green light at the third wavelength emitted from the green LED responsive to receiving the blue light at the second wavelength from the second blue LED.

16. The system of claim 13, wherein the red light at the first wavelength and the red light at the fourth wavelength increase a brightness of red light projected by the system.

17. The system of claim 13, wherein the red light at the fourth wavelength is p polarized light, and the filter is configured to transmit p polarized light at the fourth wavelength.

18. The system of claim 13, wherein the red light at the fourth wavelength is s polarized light, and the filter is configured to transmit s polarized light at the fourth wavelength.

19. The system of claim 11, wherein the lens is a first lens, the system further comprising:
a second lens optically coupled to the laser; and
a third lens optically coupled between the second lens and the diffuser, the second lens and the third lens configured to focus the polarized red light at the fourth wavelength towards the diffuser.

20. The system of claim 5, further comprising a lens optically coupled to the second filter.

* * * * *